United States Patent
Honermann et al.

(10) Patent No.: US 7,458,526 B2
(45) Date of Patent: Dec. 2, 2008

(54) REMOTE BOOM LOCK ASSEMBLY

(75) Inventors: John P. Honermann, Benson, MN (US); Matthew W. Gunlogson, Benson, MN (US)

(73) Assignee: CNH America LLC, Racine, WI (US)

(*) Notice: Subject to any disclaimer, the term of this patent is extended or adjusted under 35 U.S.C. 154(b) by 355 days.

(21) Appl. No.: 11/047,094

(22) Filed: Jan. 31, 2005

(65) Prior Publication Data

US 2006/0045715 A1 Mar. 2, 2006

Related U.S. Application Data

(60) Provisional application No. 60/590,700, filed on Jul. 22, 2004.

(51) Int. Cl.
 A01G 25/09 (2006.01)
 B05B 1/20 (2006.01)

(52) U.S. Cl. .................. 239/172; 239/159; 239/175

(58) Field of Classification Search .......... 239/172, 239/159, 161, 163, 166, 175, 167; 172/456, 172/662, 683; 248/235
 See application file for complete search history.

(56) References Cited

U.S. PATENT DOCUMENTS

| | | | |
|---|---|---|---|
| 3,807,676 A | 4/1974 | Bieker et al. | |
| 3,814,320 A | 6/1974 | Skurray | |
| 4,021,011 A | 5/1977 | Karlsson et al. | |
| 4,074,766 A | 2/1978 | Orthman | |
| 4,138,063 A | 2/1979 | Batts | |
| 4,219,947 A | 9/1980 | Paladino | |
| 4,332,094 A * | 6/1982 | Mieger | 37/443 |
| 4,379,522 A | 4/1983 | Elliott et al. | |
| 4,595,140 A | 6/1986 | Harden et al. | |
| 4,643,358 A | 2/1987 | Jackson | |
| 4,660,654 A | 4/1987 | Wiebe et al. | |
| 4,673,130 A | 6/1987 | Simpson | |
| 4,727,691 A | 3/1988 | Kubacak | |
| 4,750,691 A * | 6/1988 | Hollrock et al. | 244/137.1 |

(Continued)

FOREIGN PATENT DOCUMENTS

CA 2270631 A1 4/1999

(Continued)

OTHER PUBLICATIONS

Tyler Titan™ and Fluid-Air™ Product Brochure, 1994.

(Continued)

*Primary Examiner*—Davis D Hwu
(74) *Attorney, Agent, or Firm*—Rebecca Henkel

(57) ABSTRACT

A remote boom lock assembly is provided to secure a boom assembly supported on an agricultural vehicle or implement. The boom lock assembly is generally configured to move between a locked position and an unlocked position relative to the boom assembly as it is seated in a boom cradle structure mounted on the agricultural vehicle. The boom lock assembly includes a boom lock element mounted to the boom cradle structure, and an actuator assembly configured to selectively move the boom lock element from a locked position to an unlocked position. A remote switch is employed to control operation of the actuator assembly. The boom lock assembly further includes a spring configured to bias the boom lock element toward the locked position.

14 Claims, 7 Drawing Sheets

U.S. PATENT DOCUMENTS

| | | |
|---|---|---|
| 4,774,979 A | 10/1988 | McKeon et al. |
| 4,878,616 A | 11/1989 | Richardson |
| 4,880,160 A | 11/1989 | Paterson et al. |
| 4,944,355 A | 7/1990 | Karchewski |
| 5,029,757 A | 7/1991 | Bourgault et al. |
| 5,154,240 A | 10/1992 | Carrick |
| 5,165,486 A | 11/1992 | Davidson |
| 5,178,328 A | 1/1993 | Broyhill |
| 5,507,435 A | 4/1996 | Benest |
| 5,540,290 A | 7/1996 | Peterson et al. |
| 5,577,563 A | 11/1996 | Holen |
| 5,630,547 A | 5/1997 | Klemenhagen et al. |
| 6,012,648 A * | 1/2000 | Morris ............ 239/167 |
| 6,119,963 A | 9/2000 | Bastin et al. |
| 6,685,038 B1 * | 2/2004 | Johnston et al. ............ 212/203 |

FOREIGN PATENT DOCUMENTS

| | | |
|---|---|---|
| GB | 2088181 | 6/1982 |

OTHER PUBLICATIONS

Tyler Fluid-Air™ control console.
Tyler Fluid-Air™ specification, Jul. 10, 1989.
Tyler Fluid-Air™ Parts Manual, 1988-89.
Tyler 3-wheel Chassis Machine, Apr. 30, 2004.
Lor-AL®Products Inc. Parts Catalog, 1999.
Tyler Boom Lock Detailed Drawing, Apr. 1988.
Ag-Chem Equipment Boom Cradle Assembly, 1999.
Tyler Fluid-Air™ Operator's Manual, Jun. 1989-91.

* cited by examiner

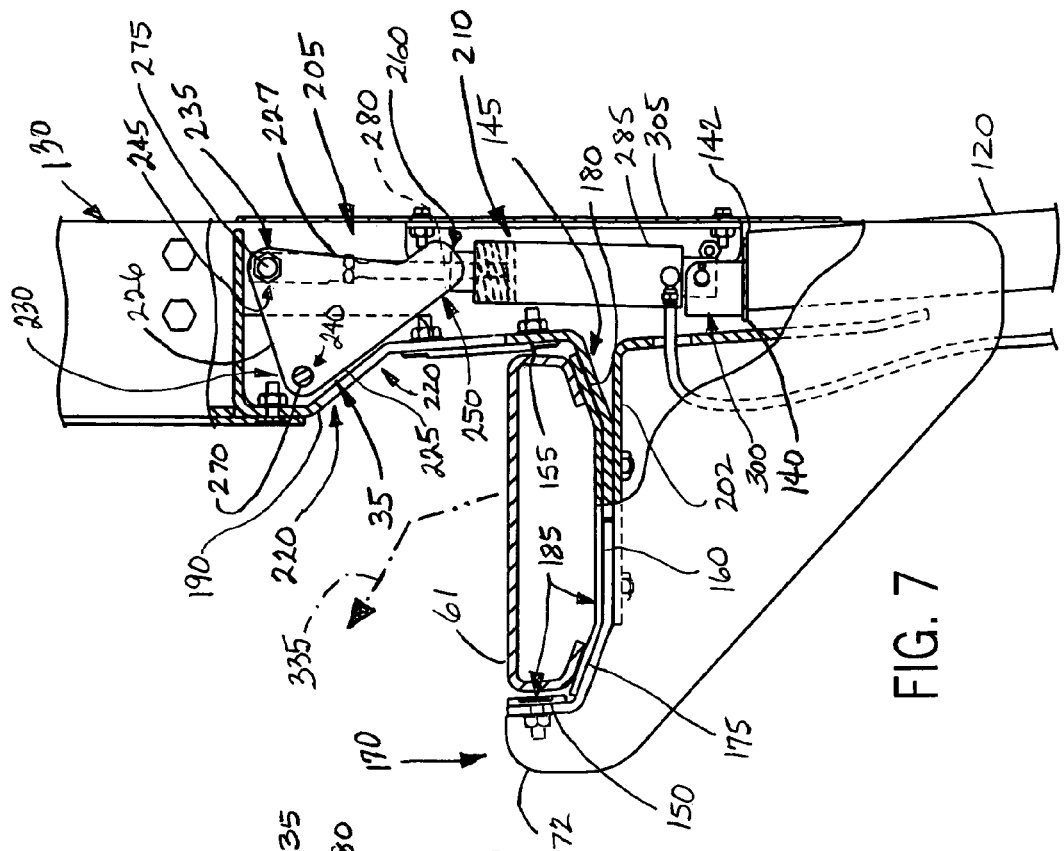

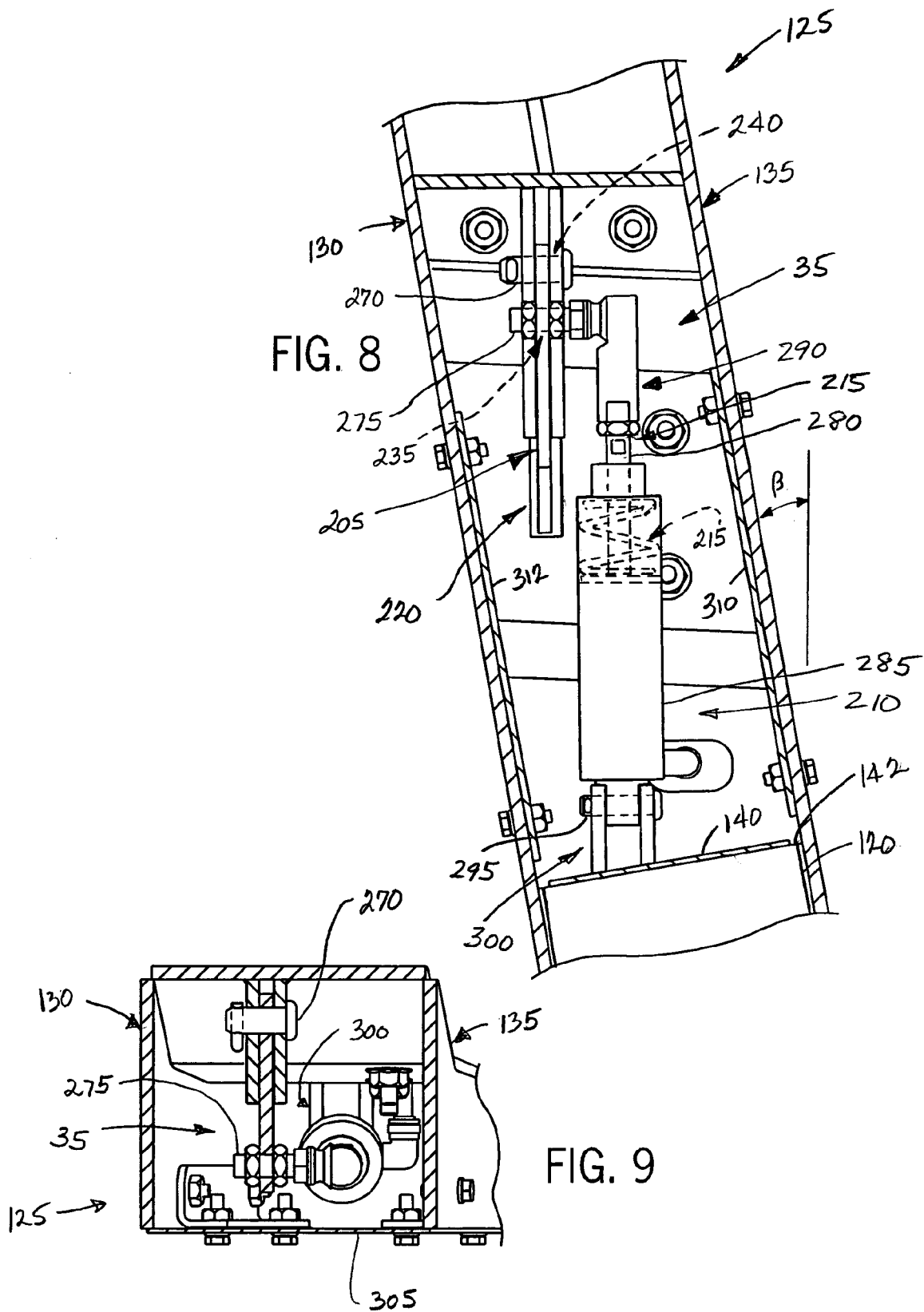

REMOTE BOOM LOCK ASSEMBLY

RELATED APPLICATIONS

This application claims priority under 35 U.S.C. Section 119(e) to U.S. Provisional Application No. 60/590,700, filed Jul. 22, 2004, hereby incorporated herein by reference in its entirety.

FIELD OF THE INVENTION

The invention relates to a remote boom lock assembly and, more specifically, relates to a lock assembly configured to remotely control automatic locking of a boom in a boom cradle or saddle structure in its inoperative, stowed position for transport on a roadway.

BACKGROUND OF THE INVENTION

Boom assemblies are commonly used on agricultural vehicles or applicators or implements, such as sprayers or planters, to dispense seed, fertilizer, insecticide, herbicide, etc. and other miscellaneous agricultural materials. The typical boom assembly is configured to pivot or fold between operative and inoperative positions relative to the boom support vehicle. In its operative position, the boom assembly commonly extends in a laterally outward direction from the boom support vehicles to a distance of ninety-feet or so such that the agricultural applicator covers a large surface area with each pass across a field. The weight of the boom assembly generally correlates with its operative length.

Upon completing distribution of the agricultural materials to the field, the boom assemblies are typically configured to swing, pivot or fold to a retracted, inoperative position. The preferred folded, inoperative position of the boom assembly is generally parallel to the direction of travel of the support vehicle such that the boom assemblies and support vehicle have a narrow profile for transport from the field and on a roadway. Folding or swinging the boom assemblies is typically performed manually or by a hydraulic system mounted between the boom assemblies and the boom support vehicle. Before transport, the boom assemblies are generally positioned in or on a boom cradle or saddle structure such that the boom assemblies are supported for travel on the roadway.

Although boom assemblies are commonly employed on agricultural vehicles and implements, known boom carrying vehicles or implements have drawbacks when transporting the folded boom assemblies. For example, when traveling on roadway in the inoperative, folded position, the boom assembly is known to bounce on the cradle structure. In fact, the boom assemblies can bounce out of the cradle structure, increasing potential opportunities for damage to the boom assembly and/or the cradle structure.

Boom lock assemblies are known, but their use presents other problems. For example, U.S. Pat. No. 6,012,648 discloses an apparatus for locking a spray boom assembly that includes a pneumatic cylinder assembly configured to extend and retract a boom cradle frame structure in a horizontal direction between locked and unlocked positions. A drawback of this known locking apparatus is that it occupies a wide profile or space extending outward from the sides of the boom carrying vehicle. Another drawback of this known boom lock apparatus is that it requires use of large pneumatic cylinder to move a complex cradle support structures both to an from the locked and unlocked positions relative to the boom.

Therefore, there is a need or desire for enhanced boom lock assembly for restraining/locking a boom in a cradle structure for transport on the roadway. The boom lock assembly should be configured to be utilized with wide variety of boom carrying agricultural vehicles, applicators, and implements.

SUMMARY OF THE INVENTION

The present invention provides an assembly for, and a method of, locking a boom in a cradle frame structure supported on an agricultural applicator that meets the desires and needs described above. The boom lock assembly of the present invention thus enhances the smooth restraint and release of the boom assembly relative to the boom cradle or saddle structure.

In a first embodiment of the present invention, a lock assembly for a boom assembly is provided. The boom lock assembly is configured to move between an operative position and an inoperative position relative to a boom cradle structure. The boom lock assembly includes a boom lock element mounted to the boom cradle structure, and an actuator assembly configured to selectively move the boom lock element from a locked position to an unlocked position. The boom lock element is configured to move to the locked position without energizing the actuator assembly so as to secure the boom in the boom cradle structure. In a preferred embodiment of the boom lock assembly, the boom lock assembly further includes a spring configured to bias the boom lock element toward the locked position.

The actuator assembly is configured to move the boom lock element toward the unlocked position against the bias of the spring. The actuator assembly is located within the boom cradle. The preferred actuator assembly is a cylinder assembly having a rod movable between an extended and a retracted position relative to a cylinder. The free end of the rod is pivotally connected at the boom lock element. The cylinder assembly is configured to extend and retract in a vertical direction. The type of cylinder assembly can include a hydraulically operated cylinder, a pneumatically operated cylinder, or an electrically operated cylinder or the like and is not limiting on the invention. The actuator assembly is controlled by a remote controller in communication with the actuator assembly.

The preferred boom lock element includes an extended finger portion having a tip configured to engage a top surface of the boom in the locked position. The boom lock element is pivotal between the locked and unlocked positions. In the unlocked position, the boom lock element is retracted within the boom cradle structure. The boom lock element includes a first pivot pin coupling the boom lock element to the frame structure, a second pivot pin coupling the actuator assembly at the boom locking element. The finger portion is located opposite the first and second pivot pins. The boom lock element is also characterized by three generally linear sides that define a first vertex or corner and a second vertex or corner adjacent the first vertex. The first vertex includes an opening to receive the first pivot pin, and the second vertex includes a second opening to receive the second pivot pin. In the locked position, the finger portion is generally vertically aligned with the second pivot pin, the second pivot pin is located above the first pivot pin.

In another embodiment, the present invention provides an agricultural implement that includes a movable boom assembly and is generally configured for applying an agricultural material to a field. The boom assembly is movable between an extended, operative position and a folded, inoperative position. The implement also includes a boom cradle structure configured to support the boom assembly in the folded, inoperative position. The implement also includes a lock assembly mounted on the cradle frame structure. The lock assembly includes a boom lock element and an actuator assembly configured to selectively move the boom lock element from a locked position to an unlocked position relative to the boom assembly. The boom lock element is configured to move to the locking position without energizing the actuator assembly so as to secure the boom in the boom cradle.

The present invention also provides a method of locking a movable boom assembly supported on an agricultural implement. The method includes the steps of engaging a lock element with the boom such that the lock element retracts into a boom cradle structure; resting the boom on the cradle structure; biasing the lock element with a spring into a locked position such that the boom assembly is restrained in the cradle structure; and moving the lock element with an actuator means from the locked position toward an unlocked position such that the boom is released to be moved from the boom cradle structure.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 6 illustrates a cross-sectional view of the boom assembly supported in the boom cradle structure, the boom lock assembly in a locked position.

FIG. 7 shows a cross-sectional view of the boom lock assembly moved to a retracted, unlocked position for release of the boom assembly from the boom cradle structure.

FIG. 8 shows a detailed cross-sectional view of the cradle frame structure and the boom lock assembly located therein along line 8-8 in FIG. 6.

FIG. 9 shows a detailed cross-sectional view of the cradle frame structure and the boom lock assembly along line 9-9 in FIG. 6.

DETAILED DESCRIPTION OF THE PREFERRED EMBODIMENTS

Figure 1:
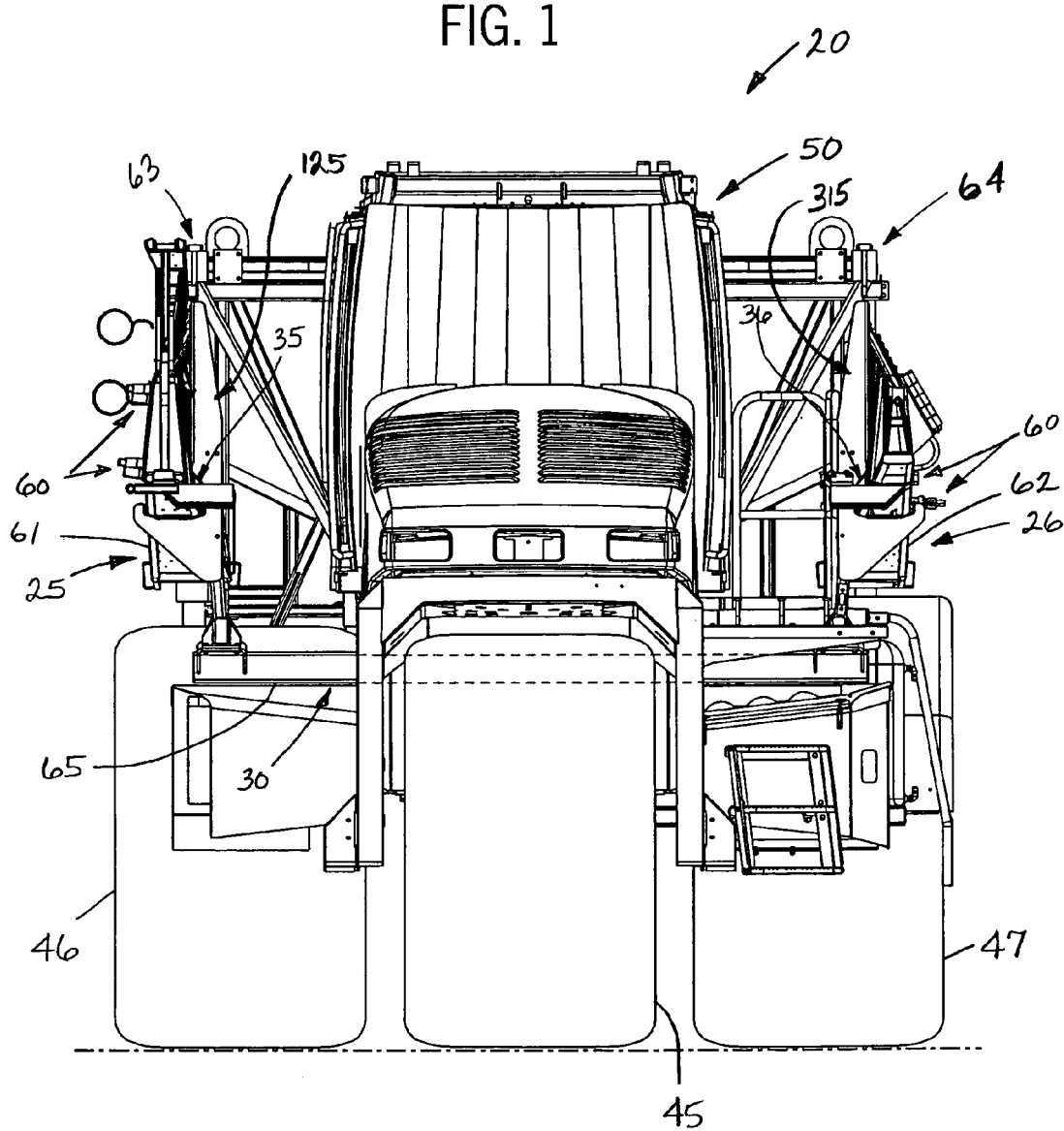
FIG. 1 illustrates a front view of an agricultural vehicle carrying a boom assembly supported by a boom cradle structure in combination with a boom lock assembly in accordance with the present invention, the boom assembly in a folded, inoperative position.
Figure 2:
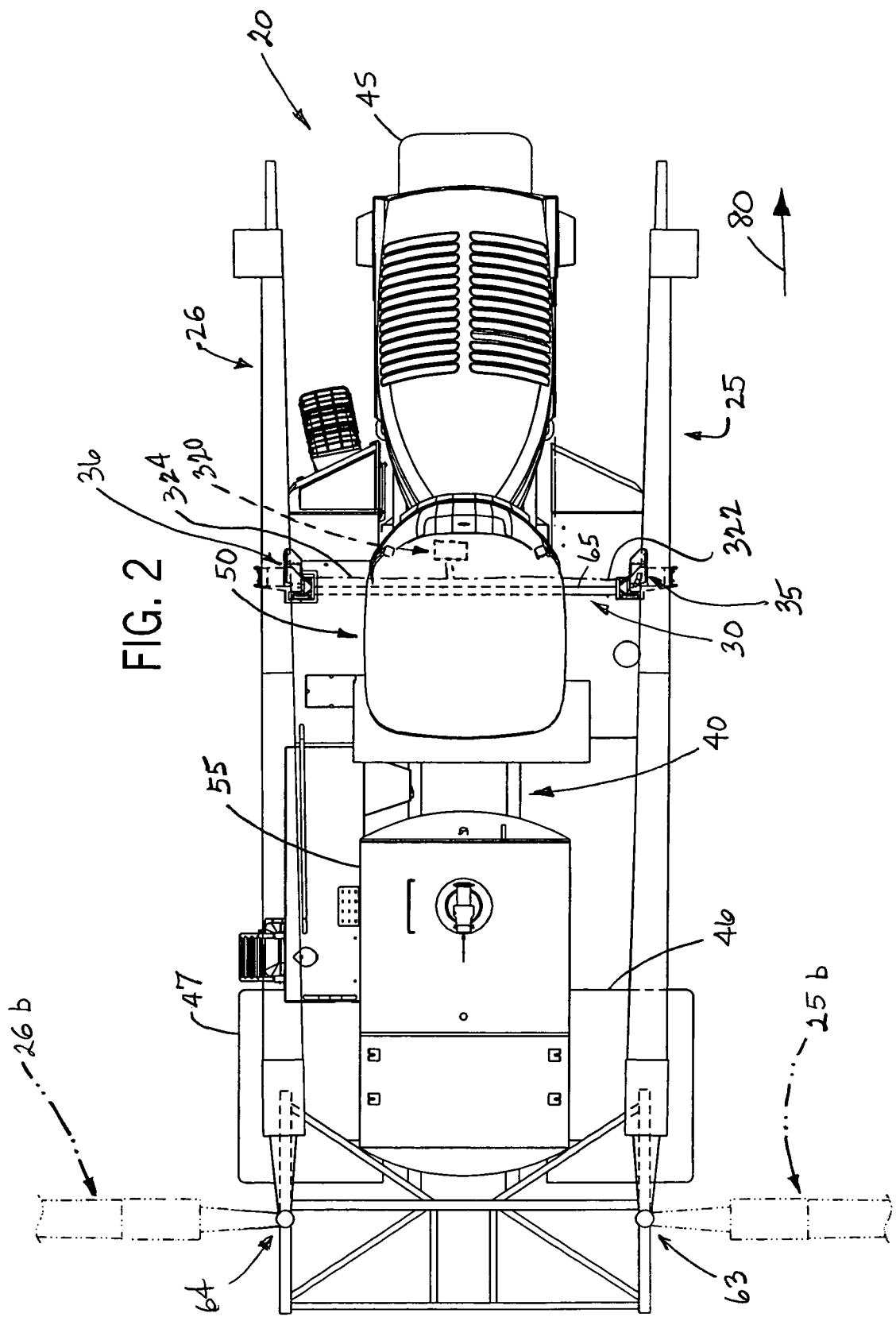
FIG. 2 shows a top plan view of the agricultural vehicle shown in FIG. 1, the boom assembly shown in FIG. 1.

FIGS. 1 and 2, show a vehicle 20 in support of or carrying a pair of boom assemblies 25 and 26. The pair of boom assemblies are configured to pivot between the illustrated folded, inoperative position and an extended, operative position (illustrated in dashed line by reference numerals 25b and 26b). In the folded, inoperative position, each of the illustrated pair of boom assemblies 25 and 26 is secured in a boom cradle structure 30 by a respective boom lock assembly 35 and 36 in accordance with the present invention.

The preferred vehicle 20 shown is a conventional agricultural sprayer of a type commonly used to apply crop nutrients or animal or human waste (sludge) to soils, typically before planting in the spring and/or after harvest in the fall. The vehicle 20 generally includes a frame structure 40 (see FIG. 2) supported on plurality of oversized wheel assemblies 45, 46, 47. The vehicular frame 40 is configured to support the pair of boom assemblies 25, 26 and the boom cradle structure 30. The vehicular frame 40 also supports a cab 50 enclosing a control station (not shown) where an operator typically steers and controls operation of the vehicle 20.

Still referring to FIGS. 1 and 2, the frame 40 of the vehicle 20 also supports a reservoir or storage tank 55 (see FIG. 2) in fluid communication with a series of nozzles 60 (see FIG. 1) mounted along each of the pairs of boom assemblies 25 and 26. With the boom assemblies 25 and 26 in their operative positions (illustrated in dashed line and respective reference numerals 25b and 26b), an agricultural product is communicated in a known manner from the reservoir 55 to the series of spray nozzles 60 (see FIG. 1) for distribution across a wide surface area of the field. The boom assemblies 25 and 26 each generally include a boom arm 61 and 62 that is pivotable by a drive(s) (not shown) about a vertical hinge support 63 and 64, respectively, so as to move the boom assemblies 25 and 26 between the folded, inoperative position and the extended, operative position.

Figure 3:
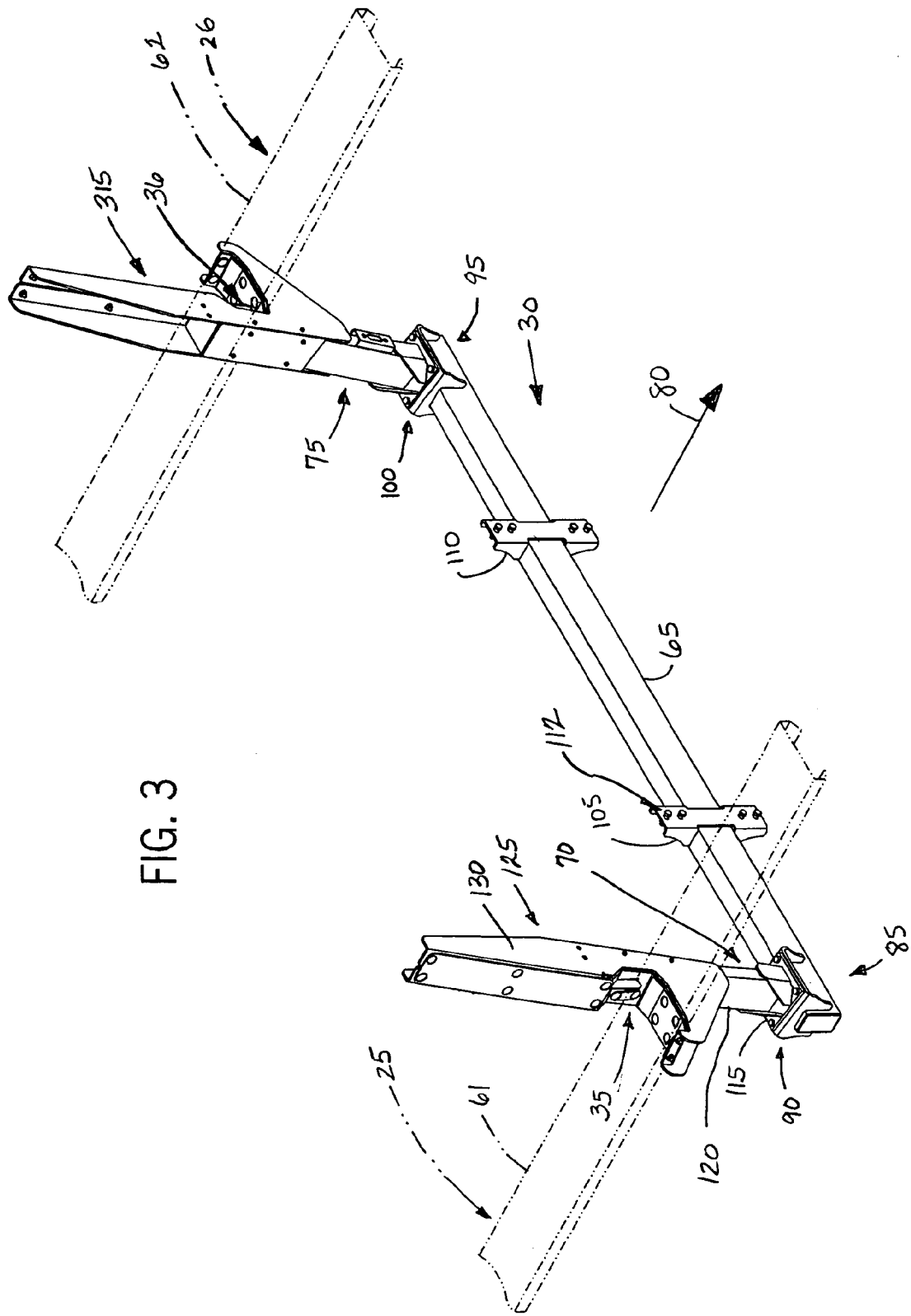
FIG. 3 illustrates a detailed perspective view of the boom cradle structure shown in FIG. 1.

FIG. 3 illustrates one embodiment of the boom cradle structure 30 in accordance with the present invention. The boom cradle structure 30 generally includes a crossmember 65 in support of a first cradle support 70 and a second cradle support 75.

The preferred crossmember 65 is square and tubular shaped and extends generally perpendicular to a forward direction of travel (illustrated by arrow 80) of the vehicle 20 shown in FIGS. 1 and 2. A first end 85 of the crossmember 65 includes a first platform 90 to receive the first cradle support 70. A second end 95 of the crossmember 65 includes a second platform 100 to receive the second cradle support 75. The first and second platforms 90 and 95 each generally includes a planar surface with mounting holes to receive and mount the first and second cradle supports 70 and 75, respectively. A first and a second vehicle mount 105 and 110 respectively, are positioned between the first and second ends 85 and 95 along a length of the crossmember 65. Each vehicle mount 105 and 110 is generally vertically aligned and includes mounting holes configured to receive fasteners 112 to secure the crossmember 65 to the frame structure 40 of the vehicle 20 (see FIG. 2).

Figure 4:
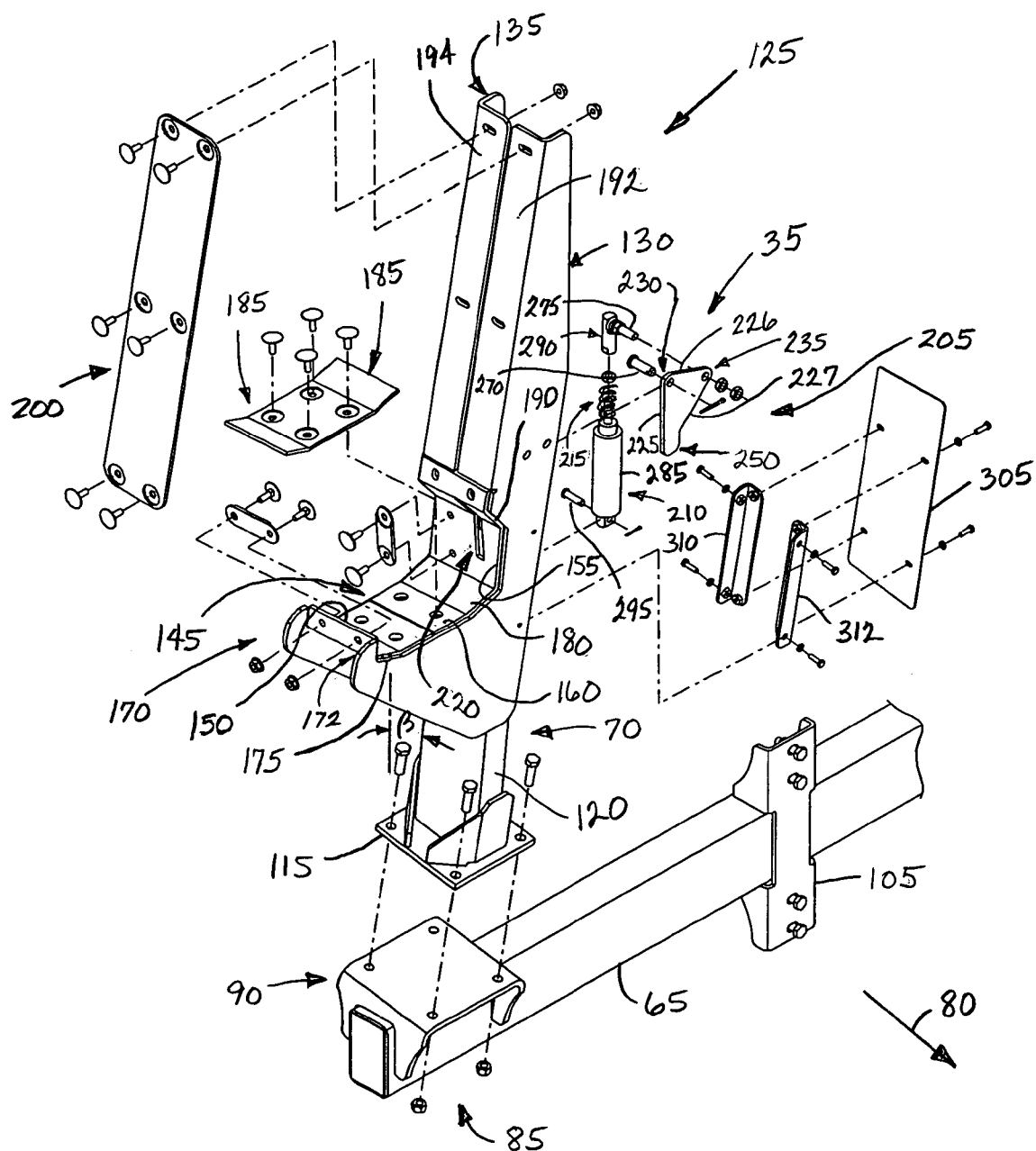
FIG. 4 illustrates an exploded perspective view of the boom cradle structure in combination with the boom lock assembly in accordance with the present invention.

FIG. 4 shows a detailed exploded view of the preferred first cradle support 70 having a base plate mount 115 configured to receive the first platform 90. The first platform 90 is disposed at an angle such that a post member 120 extends upward at an angle ($\beta$) with respect to vertical. A cradle arm 125 is mounted on an opposite end of the post member 120 from the base plate mount 115. The cradle arm 125 includes a forward sideplate 130 opposite a rearward sideplate 135. A first crossmember 140 (see FIG. 8) extends between the first and second sideplates 130 and 135 and is configured to receive an upper end 142 of the post member 120. The first and second sideplates 130 and 135 each are configured to the support a cradle seat 145 therebetween to receive the boom assembly 25 (see FIG. 2).

Figure 5:
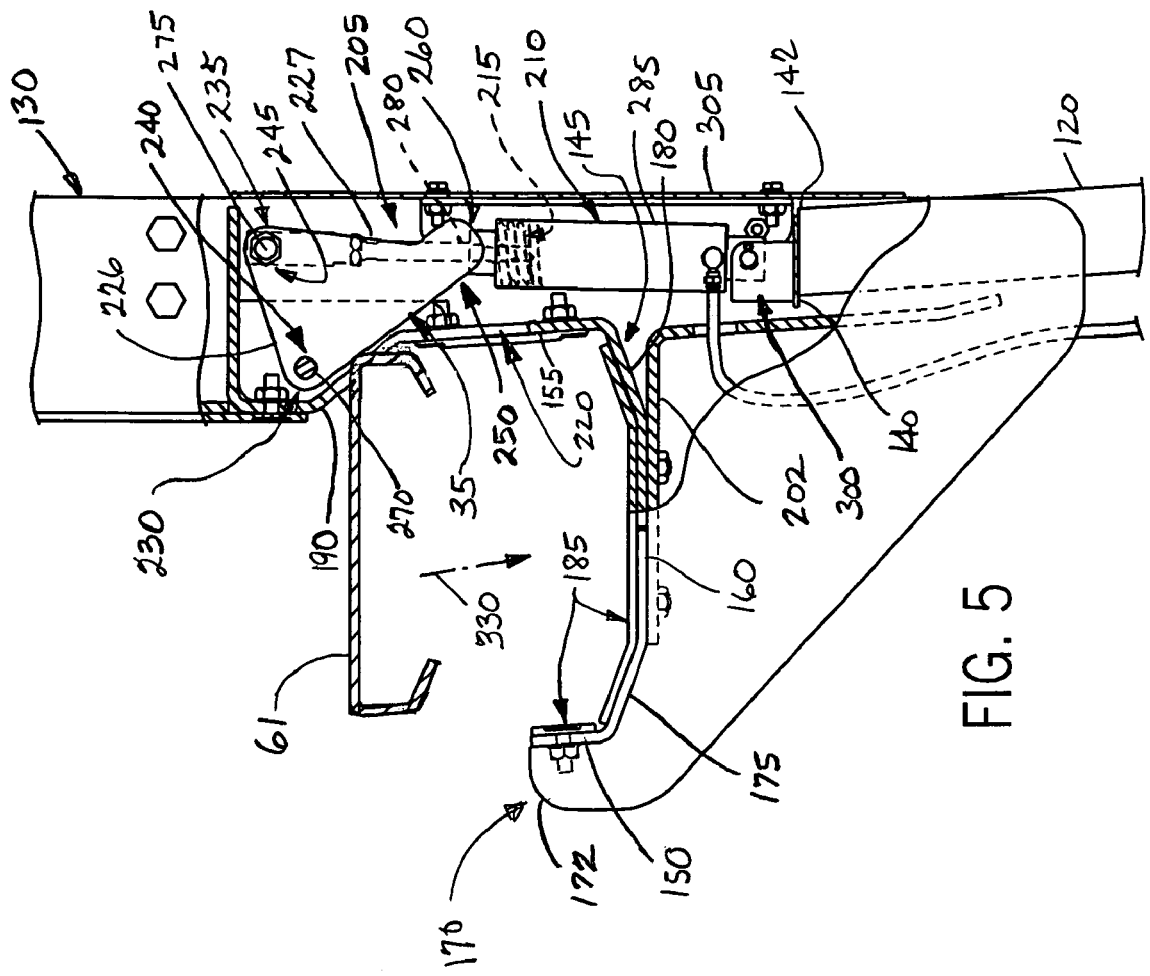
FIG. 5 shows a cross-sectional view of the boom assembly biasing the boom assembly toward a retracted, unlocked position for placement in the boom cradle structure.

Referring to FIGS. 4-7, the preferred cradle seat 145 generally includes a metal plate(s) that is shaped to receive the boom arm 61 of the boom assembly 25 (see FIG. 2). The cradle seat 145 is defined by an outer vertical face 150, an inner vertical face 155, and a generally horizontal bottom surface 160 extending therebetween. The outer vertical face 150 is generally defined by a lip 170 located at the laterally outermost portion of the cradle arm 125 relative to forward direction of travel 80 (see FIG. 2). The lip 170 of the cradle arm 125 preferably includes a curvilinear portion 172 that adjoins at the outer vertical face 150 of the cradle seat 145. The inner vertical face 155 extends generally above the outer vertical face 150 and lip 170. The bottom surface 160 of the cradle seat 145 can further include a first inclined portion 175 that extends upward to adjoin the outer vertical face 150, and a second inclined portion 180 extending upward therefrom to adjoin the inner vertical face 155. A first pad or boom liner 185 is generally positioned at the cradle seat 145 so as to receive and engage the boom assembly 25 in a cushioned fashion. The cradle seat 145 is further defined by an upper face 190 extending laterally outward and upward from the inner vertical face 155. Referring to FIG. 4, located above the cradle seat 145 is a first lateral face 192, formed by the forward sideplate 130, abutting a second lateral face 194, formed by the rearward sideplate 135. The upper faces 192 and 194 are configured to receive a second pad 200 so as to be engaged by the boom assembly 25 (see FIG. 2) in a cushioned fashion, similar to the first pad 185 described above. Referring to FIGS. 5-7, the cradle seat 145 is generally supported from underneath by a L-shaped support bracket 202.

Referring to FIGS. 4-9, the boom lock assembly 35 is generally located between the first and second sideplates 130 and 135 of the cradle arm 125. Referring specifically to FIGS. 4-7, the boom lock assembly 35 includes a lock element 205 in combination with an actuator assembly 210 configured to move the lock element 205 between a retracted, unlocked position and an extended, locked position relative to the cradle arm 125. The boom lock assembly 35 further includes a spring 215 (illustrated in dashed line) configured to bias the lock element 205 toward the extended, locked position. The inner vertical face 155 and the upper vertical face 190 that define the boom cradle seat 145 includes a slot or slit or cutout portion 220 extending therealong such that the lock element 205 is allowed to move between its retracted, unlocked position and its extended, locked position relative to the cradle arm 125.

Referring now to FIGS. 5-7, the preferred lock element 205 includes a generally right triangular-shaped plate that includes three linear sides 225, 226 and 227 that generally define a first vertex or corner 230 adjacent to a second vertex 235, with side 226 extending therebetween. Although the illustrated first and second vertices 230 and 235 are generally curvilinear-shaped, the shape of the first and second vertices 230, 235 can vary. A first opening 240 is located closest to and/or adjacent the first vertex 230, and a second opening 245 is generally located closest to and/or adjacent the second vertex 235. The sides 225 and 227 adjoin or meet at an extended finger portion 250 located opposite the first and second vertices 230 and 235. The extended finger portion 250 includes a generally curvilinear-shaped tip 260. The extended finger portion 250 is generally aligned with the side 225. The first opening 240 at the first vertex 230 is configured to receive a first pivot pin 270 configured to couple the lock element 205 to the cradle arm 125. The second opening 245 at the second vertex 235 is configured to receive a pivot pin 275 connecting the actuator assembly 210 to the lock element 205.

In the retracted, unlocked position as illustrated in FIG. 7, the extended finger portion 250 of the lock element 205 is retracted inward through the slot 220 and between the first and second sidewalls 130 and 135 of the cradle arm 125. In the extended, locked position as illustrated in FIG. 6, the extended finger portion 250 of the lock element 205 is extended outward from the slot 220 into a generally vertically aligned position such that the tip 260 of the extended finger portion 250 is engaged against or disposed adjacent to a top surface of the boom arm 61 as it rests on the bottom surface 160 of the boom cradle seat 145. The locked position of the lock element 205 is also characterized such that the first pivot pin 270 is generally vertically aligned with the tip 260 of the extended finger portion 250, as well as the second inclined surface 180 of the cradle seat 145. In addition, when in the locked position, the first pivot pin 270 is located generally above the second pivot pin 275. This configuration enhances the strength of the lock element 205 in securing the boom assembly 25 in the cradle seat 145 of the cradle arm 125.

As illustrated in FIG. 8, the actuator assembly 210 is located between the sideplates 130 and 135 of the cradle arm 125. The preferred actuator assembly 210 generally includes a cylinder assembly having a rod 280 that extends and retracts to and from a cylinder 285. A free end of the rod 280 includes a coupling 290 having an opening to receive the second pivot pin 275 in coupling the rod 280 to the lock element 205. A lower end of the cylinder 285 opposite the rod 280 is coupled by a pin 295 to a bracket 300 mounted at or integral with the first crossmember 140 of the cradle arm 125. The actuator assembly 210 is generally mounted to the cradle arm 125 such that the rod 280 extends and retracts in a generally vertical direction. It should be understood that the type of actuator assembly 210 (e.g., pneumatic, electronic, hydraulic, etc.) can vary and is not limiting on the invention.

Referring to FIG. 5, the preferred spring 215 is a compression type spring configured to bias the locking element 205 to the extended, locked position. The spring 215 is located so as to bias the rod 280 to extend from the cylinder 285. Alternatively, the spring (illustrated in dashed line and reference numeral 215b) can be mounted between the locking element 205 and the cradle arm 125 in a similar manner so as to bias the lock element 205 toward the extended, locked position.

Referring to FIGS. 4 and 8, the cradle arm 125 can further include a cover plate 305 configured to be attached by a pair of brackets 310 and 312 so as to enclose the actuator assembly 210 and the lock element 205 between the side plates 130 and 135 of the cradle arm 125. The cover plate 305 serves to protect and yet provide ready access to the boom locking assembly 35.

It should be understood that the foregoing description of the cradle support 70 in combination with the cradle arm 125 and boom lock assembly 35 applies with equal force to the cradle support 75 in combination with a boom cradle arm 315 and the second boom lock assembly 36 as illustrated in FIG. 3. Therefore, although not described in detail, it is understood that the second cradle arm 315 and respective second boom lock assembly 36 are generally configured and operate to secure the second boom assembly 26 (see FIGS. 1 and 2) in a manner similar to the cradle arm 125 and first boom lock assembly 35 with respect to the first boom assembly 25 as described above.

Referring back to FIG. 2, the boom locking assemblies 35 and 36 are operated by a remote electronic controller or a remote control switch 320 in communication with the actuator assembly 210 (see FIGS. 5-8). The remote controller 320 is preferably located in the cab 50 of the agricultural vehicle 20, yet the location of the remote controller 320 can vary. The preferred remote controller 320 includes a switch or other known controller that is configured to be operated by the operator in the cab 50 so as to communicate a signal (either via wireless transmission or by communication lines 322 and 324). Referring to FIGS. 5-8, in response to the signal from the controller 320, the actuator assembly 210 moves the lock element 205 from its locked position (FIG. 6) to its unlocked position (FIG. 7) against the bias of the spring 215 so as to release the boom assemblies 25 and 26 from the folded, inoperative position in the cradle assembly 30 (see FIG. 2). It is understood that one or more additional local control switches (not shown) can be located adjacent to each boom assembly 25 and 26 and connected so as to provide local control of operation of the boom locking assemblies 35 and 36. For the preferred boom lock assembly 35 and 36, the communication lines 322 and 324 (see FIG. 2) are routed from the cylinder assembly 210 (see FIGS. 5-8) and along the crossmember 65 to the remote controller 320 in the cab 50. It should be understood that the remote controller 320 can be connected to communicate the signal via a variety of communication lines 322 and 324 (pneumatic, hydraulic, or electrical line, or combination thereof) and is not limiting on the invention.

In operation, the boom lock assemblies 35 and 36 function as follows. For example, assume that the boom arm 61 of the boom assembly 25 is positioned in the operative extended position (illustrated by dashed line and references 25b and 26b), and the boom lock assembly 35 is positioned in the extended, locked position (see FIG. 6). In a known matter, the boom assembly 25 is swung or rotated towards the cradle arm 125 of the boom cradle apparatus 30. As illustrated in FIG. 5, the boom arm 61 is moved such that it is lifted over the lip 170 of the cradle arm 125. The boom arm 61 continues to move in a direction towards the boom cradle seat 145 and engages against the extended lock element 205. The engagement by the boom arm 61 causes the lock element 205 to pivot and retract into the slot 220 defined by the cradle arm 125, and toward the recessed, unlocked position against the bias of the spring 215. The boom arm 61 then falls toward a rested or seated position (illustrated by arrow 330) in-between the outer vertical face 150 and the inner vertical face 155 of the boom cradle seat 145. Once in the rested, seated position as illustrated in FIG. 6, a top surface of the boom arm 61 is configured to lie below the lowermost portion of the tip 260 of the extended finger portion 250 such that the spring 215 is operable to bias and hold the lock element 205 in the extended, locked position outward from the slot 220. Once in the locked position, the tip 260 of the extended finger portion 250 is configured to engage at a top surface of the boom arm 61. The extended finger portion 250 is configured to hold and secure the boom arm 61 in the cradle seat 145 of the cradle arm 125 until such a time as an operator desires to release the boom arm 61 so that it can be moved back to the extended, operative position.

Referring now to FIG. 7, at such time as the boom arm 61 is to be moved from its seated, inoperative position to an extended, operative position, the operator actuates the remote controller 320 from the cab 50 so as to communicate an activation signal. In response to the activation signal, the actuator assembly 210 energizes and extends the rod 280, and thereby pivots the lock element 205 about the pivot pin 270, such that the extended finger portion 250 moves toward the retracted, unlocked position against the bias of the spring 215. The actuator assembly 210 will continue to stay energized so as to exert a force to maintain the extended finger portion 250 in the retracted, unlocked position against the bias of the spring 215 until such time as the boom arm 61 is moved from and cleared (illustrated by arrow 335) from the cradle arm 125 and swung or pivoted towards the extended, operative position. Upon clearance of the boom arm 61 from the cradle arm 125, the remote controller 320 can be manually or automatically switched to interrupt the activation signal from the controller 320 so as to cause the actuator assembly 210 to de-energize such that the spring 215 once again is operable to bias and hold the extended finger portion 250 in the extended, locked position (see FIG. 5).

Although the above-described actuator assembly 210 and remote controller 320 are in communication via a pneumatic system, the invention is not so limited. The system to communicate the signal from the remote controller 320 to the actuator assembly 210 can be hydraulic, pneumatic, electrical, or any combination thereof and is not limiting on the invention. Moreover the means of communication (e.g., wireless transmission, wiring, conduit, etc.) between the remote controller 320 and the actuator assembly 210 can vary.

A wide variety of vehicles 20 in support of a boom assembly 25 and 26 could be constructed in accordance with the invention defined by the claims. Hence, while the preferred embodiment of the invention was described above with reference to the boom assembly 25 and 26 of the agricultural spray applicator, one skilled in the art will recognize that the invention is in no way so limited. The boom locks assemblies 25 and 26 of the invention can be configured to secure a boom assemblies 25 and 26 configured for wide variety purposes (e.g., spraying, planting, spreading, harvesting, etc.) and on a wide variety of mobile machines, vehicles, or towed implements and is not limiting on the invention.

Many changes and modifications could be made to the invention without departing from the spirit thereof. The scope of these changes will become apparent from the appended claims.

We claim:

1. A boom lock assembly for a boom movable between an operative position and an inoperative position, comprising:
    a boom cradle structure which includes a crossmember in support of a first cradle support and a second cradle support;
    a first end of the crossmember includes a first platform to receive said first cradle support;
    a second end of the crossmember includes a second platform to receive said second cradle support;
    said first and second platforms each include a planar surface with mounting holes to receive and mount said first and second cradle supports respectively;
    said first and second cradle supports having a base plate mount configured to receive said first and second platform respectively;
    said first platform is mounted to post member which extends vertically;
    a cradle arm mounted on an opposite end of said post member from said base plate mount;
    a boom lock element pivotably mounted to the boom cradle structure, the boom lock element being moveable between a locked position and an unlocked position;
    an actuator assembly pivotably connected at the boom lock element and operable to selectively move the boom lock element from the locked position to the unlocked position; and
    a spring connected at the boom lock element and configured to bias the boom lock element towards the locked position;
    wherein:

the boom lock element is moveable between the locked position and the unlocked position independent of the actuator assembly; and the boom locking element is held in the locked position without energizing the actuator assembly so as to secure the boom in the boom cradle structure.

2. The boom lock assembly as recited in claim 1, wherein the actuator assembly moves the boom lock element toward the unlocked position against the bias of the spring.

3. The boom lock assembly as recited in claim 1, wherein the actuator assembly includes a hydraulically operated cylinder.

4. The boom lock assembly as recited in claim 1, wherein the actuator assembly includes a pneumatically operated cylinder.

5. The boom lock assembly as recited in claim 1, wherein the actuator assembly includes an electrically operated cylinder.

6. The boom lock assembly as recited in claim 1, wherein operation of the actuator assembly is controlled by a switch that is remotely located from the actuator assembly.

7. The boom lock assembly as recited in claim 1, wherein the actuator assembly is located inside the boom cradle structure.

8. The boom lock assembly as recited in claim 1, wherein the boom locking element includes an extended finger portion having a tip configured to engage at a top surface of the boom in the locked position.

9. The boom lock assembly as recited in claim 1, wherein the actuator assembly is a cylinder assembly having a rod movable between an extended and a retracted position relative to a cylinder.

10. The boom lock assembly as recited in claim 9, wherein the free end of the rod is pivotally connected at the boom lock element.

11. The boom lock assembly as recited in claim 10, wherein the cylinder assembly is positioned to extend and retract in a vertical direction.

12. The boom lock assembly as recited in claim 1, wherein the boom lock element pivots between the locked and unlocked positions.

13. The boom lock assembly as recited in claim 1, wherein the boom lock element retracts inside the boom cradle structure when moved to the unlocked position.

14. An agricultural implement configured for applying an agricultural material, comprising:

a vehicle which includes a vehicle frame structure supported on a plurality of wheel assemblies;

said vehicle frame structure configured to support a pair of boom assemblies;

said vehicle frame structure supports a reservoir tank in fluid communication with a series of nozzles mounted alone each of said boom assemblies;

said boom assemblies each include of boom arm configured to be moveable between an operative position and an inoperative position;

a boom cradle structure which includes a crossmember in support of a first cradle support and a second cradle support;

a first and of the crossmember includes a first platform to receive said first cradle support;

a second end of the crossmember includes a second platform to receive said second cradle support;

said first and second platforms each include a planar surface with mounting holes to receive and mount said first and second cradle supports respectively;

said first and second support cradle supports have a base plate mount configured to receive said first and second platform respectively;

said first platform is mounted to a post member which extends vertically;

a cradle arm mounted on an opposite end of said post member from said base plate Mount;

a lock assembly mounted on the boom cradle structure, the lock assembly including:

a boom lock element pivotably connected to the cradle structure and moveable between locked and unlocked positions;

an actuator assembly configured to selectively move the boom lock element from the locked position to the unlocked position relative to the boom; and a spring connected at the boom lock element and configured to bias the boom lock element towards the locked position;

wherein:

the boom lock element is pivotably connected to the actuator assembly;

the boom lock element is moveable between the locked position and the unlocked position independent of the actuator assembly; and the boom lock element is held to the locked position when an activation signal is interrupted to the actuator assembly.

* * * * *